Patented Apr. 29, 1930

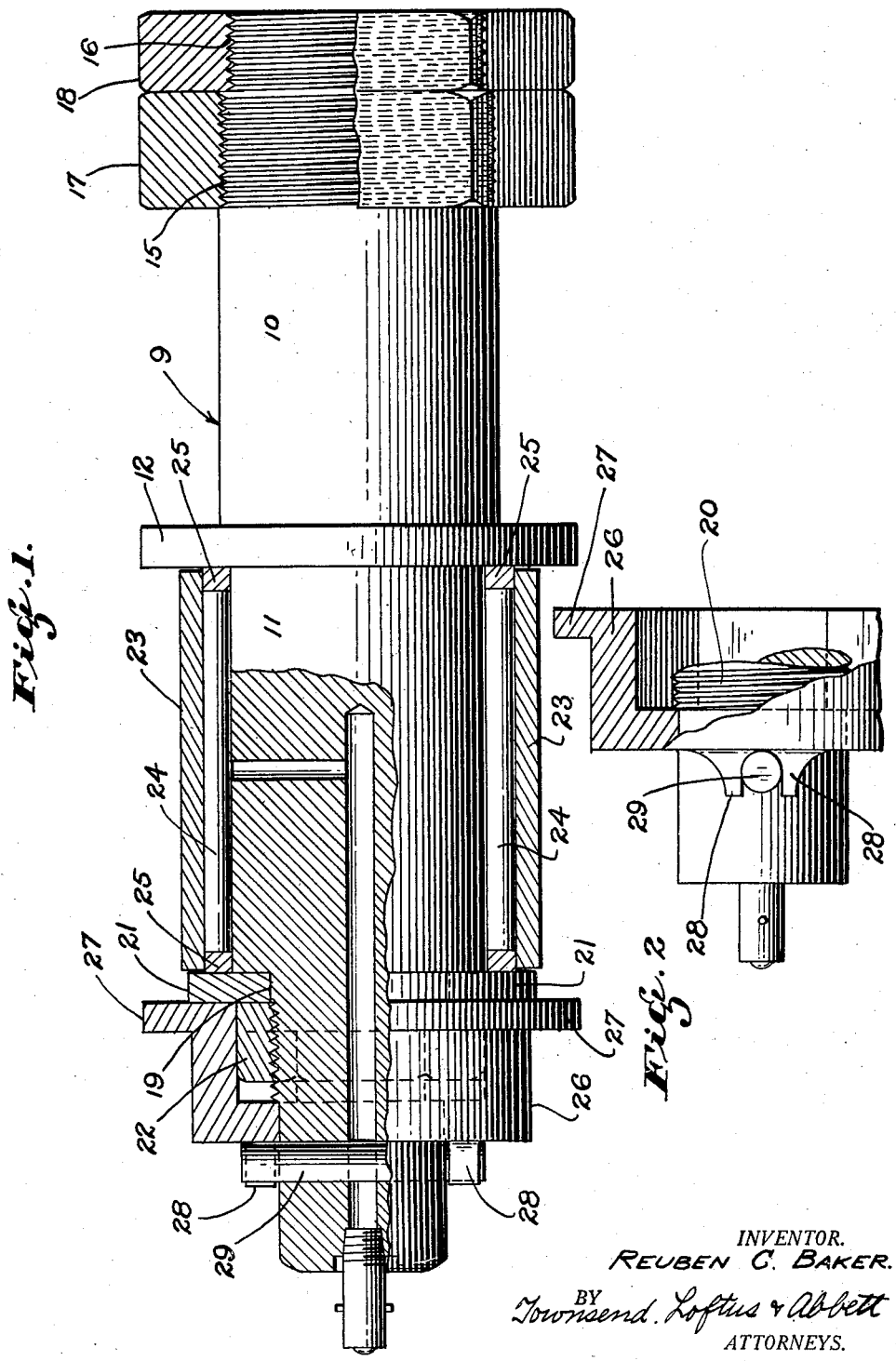

1,756,504

UNITED STATES PATENT OFFICE

REUBEN C. BAKER, OF COALINGA, CALIFORNIA

WRIST PIN

Application filed January 30, 1929. Serial No. 336,047.

This invention relates to a wrist pin for connecting a pitman rod to a crank in a well pumping ring.

It is the principal object of the present invention to provide an improved wrist pin for connecting a pitman rod to a crank, which wrist pin can be expeditiously connected or disconnected from the pitman, affords a lubricated anti-friction bearing for the pitman, and in addition, permits the crank to turn in either direction without disrupting the connection between the crank and the wrist pin.

One form which the invention may assume is exemplified in the following description and illustrated by way of example in the accompanying drawing, in which:

Figure 1 is a view in elevation and section of a wrist pin embodying the preferred form of my invention.

Figure 2 is a fragmentary view of the same, disclosing the manner in which the cap is secured in position.

Referring more particularly to the accompanying drawing, 9 indicates a wrist pin having two bearing portions 10 and 11. These portions are located at opposite ends of the pin and are separated by an annular flange 12. The end 10 of the wrist pin is designed to be inserted through a crank while the end 11 is adapted to be received by the pitman rod bearing. The outer end of the crank end 10 of the wrist pin is formed with adjacent threaded portions 15 and 16. The threads of these portions 15 and 16 are of different leads. These threaded portions 15 and 16 receive nuts 17 and 18 and when the nuts are in place clamping the pin 9 in a crank bearing the provision of the double threaded portions permits the crank to be run in both directions without working the nuts 17 and 18 loose.

The outer extremity of the pitman end 11 of the wrist pin is reduced in diameter as at 19 and is formed with a threaded portion 20 contiguous to the bearing portion. A collar 21 is arranged on the reduced portion 19 intermediate the threaded portion 20 and the end of the pitman bearing portion 11. The collar 21 just referred to abuts against the shoulder formed by the different diameters of the portions 19 and 11. The collar 21 is clamped in this position by a nut 22 which is threaded on the threads 20 of the reduced shank 19.

The collar 21 and the flange 12 cooperate in confining a bearing sleeve 23 in position on the portion 11 of the wrist pin. Rollers 24 are arranged between the sleeve 23 and the exterior surface of the portion 11 to form an anti-friction bearing for the pitman. Washers or retainer rings 25 are arranged at the ends of the rollers 24 as illustrated.

The bearing sleeve 23 is slightly less in length than the space between the flange 12 and the collar 21. This permits the sleeve to revolve freely. The sleeve is also slightly larger in exterior diameter than the exterior diameter of the collar 21 so that the pitman bearing will not bear on the collar.

In order to retain the pitman bearing in place on the wrist pin, I provide a retainer collar 26. This retainer collar is bored to fit over the reduced end 19 of the wrist pin and it is counterbored to accommodate the nut 22 so that its inner face may abut against the collar 21. At this inner face the retainer collar is formed with an enlarged circumscribing flange 27 of a diameter substantially the same as the diameter of the flange 12. These flanges 12 and 27 abut against the ends of the pitman bearing and retain the same in place on the wrist pin.

To lock the retainer collar in position it is formed with sockets 28 arranged on the outer face of the retainer collar and at diametrically opposed points. These sockets are adapted to receive the ends of a locking pin 29. This locking pin is removably projected through a transverse hole drilled through the wrist pin. The engagement between the pin and the sockets 28 prevents both axial and rotary movement of the retainer collar relative to the wrist pin.

In actual practice the parts are constructed as illustrated and all are assembled with the exception of the nuts 17 and 18 and the retainer collar 26 and the pin 29. The end 10 of the wrist pin is then engaged with the crank bearing and the nuts 17 and 18 are threaded on the threaded sections 15 and 16 to clamp the wrist pin in place relative to the crank. As the nuts 17 and 18 are threaded on threaded portions having threads of different leads, the crank may turn in either direction without any risk of loosening the nuts.

The pitman bearing is then arranged on the anti-friction bearing of the wrist pin. The retainer collar is then arranged in place to secure the pitman bearing between it and the flange 12. The pin 29 is inserted through the reduced end 19 with its ends engaging the sockets in the retainer collar. This locks the retainer collar in position.

To lubricate the anti-friction bearing, a lubricating passageway is formed axially through the end 11 of the wrist pin and then radially to the anti-friction bearing. A lubricating fitting may be disposed at the end of the wrist pin in communication with this passageway so that lubricant may be forced through the passageway to the bearing.

I desire to point out that the arrangement of the retainer collar 26 on the wrist pin is such that it is only necessary to remove the pin 29 and then slip the retainer collar off of the wrist pin in order to disconnect the pitman from the wrist pin. Likewise, it is a simple matter to reconnect the pitman to the wrist pin.

I also desire to point out that by my present construction I provide an anti-friction bearing for the pitman rod and provide means enabling this anti-friction bearing to be properly lubricated.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A wrist pin comprising a wrist pin body, a flange arranged intermediate the ends of the same to divide the body into a crank bearing portion and a pitman bearing portion, the outer extremity of the pitman bearing portion being reduced in diameter, a sleeve arranged over the pitman bearing portion, a plurality of rollers interposed between the sleeve and the pitman bearing portion, means retaining the sleeve and rollers in position, a retainer collar arranged over the reduced end, said retainer collar having a flange cooperating with the flange on the body to retain a pitman bearing therebetween, said retainer collar having sockets at its outer end, and a pin removably projecting through the reduced end and engaging said sockets to retain the collar in position.

2. A wrist pin comprising a wrist pin body portion, a flange formed thereon dividing the same into a crank bearing portion and a pitman bearing portion, the extremity of the pitman bearing portion being reduced and formed with a threaded portion, a collar arranged over the reduced end, a nut engaging the threads to clamp the collar in position, a sleeve rotatably disposed between the collar and the flange and retained in position thereby, rollers arranged intermediate the sleeve and the body, a retainer collar fitting over the reduced end and the nut and abutting against the other collar, said retainer collar having a circumscribing flange to cooperate with the other flange to retain a pitman bearing therebetween, and means removably securing said retainer collar in position.

3. A wrist pin comprising a wrist pin body portion, a flange formed thereon dividing the same into a crank bearing portion and a pitman bearing portion, the extremity of the pitman bearing portion being reduced and formed with a threaded portion, a collar arranged over the reduced end, a nut engaging the threads to clamp the collar in position, a sleeve rotatably disposed between the collar and the flange and retained in position thereby, rollers arranged intermediate the sleeve and the body, a retainer collar fitting over the reduced end and the nut and abutting against the other collar, said retainer collar having a circumscribing flange to cooperate with the other flange to retain a pitman bearing therebetween, means removably securing said retainer collar in position, said means comprising sockets formed in the outer end of the retainer collar, and a pin adapted to be projected diametrically through the reduced end and engage said sockets.

4. A wrist pin comprising a wrist pin body portion, a flange formed thereon dividing the same into a crank bearing portion and a pitman bearing portion, the extremity of the pitman bearing portion being reduced and formed with a threaded portion, a collar arranged over the reduced end, a nut engaging the threads to clamp the collar in position, a sleeve rotatably disposed between the collar and the flange and retained in position thereby, rollers arranged intermediate the sleeve and the body, a retainer collar fitting over the reduced end and the nut and abutting against the other collar, said retainer collar having a circumscribing flange to cooperate with the other flange to retain a pitman bearing therebetween, means removably securing said retainer collar in position, the extremity of the crank bearing portion being formed with adjacent threaded portions having threads of different leads, and nuts to engage said threaded portions to clamp a crank bearing between the flange and nuts.

5. A wrist pin comprising a wrist pin body, a flange circumscribing the same intermediate its ends dividing the wrist pin body into a crank bearing portion and a pitman bearing portion, the extremity of the pitman bearing portion being reduced in diameter and formed with a threaded portion, a collar fitting between the threaded portion and the larger portion, a nut threaded on the threaded portion of the reduced end and clamping said collar against the larger portion, a sleeve arranged over the body intermediate the collar and the flange, said sleeve being slightly less in length than the distance between the collar and the flange, said sleeve being slightly larger in diameter than the collar, rollers interposed between the sleeve and the wrist pin body to provide an anti-friction bearing, a retainer collar bored to receive the reduced end and counterbored to accommodate the nut whereby its inner end will abut against the collar, said inner end of the retainer collar being formed with a flange to cooperate with the flange on the wrist pin body to retain a pitman bearing therebetween, said retainer collar having sockets formed at its outer end, said reduced end having a diametrically extending bore adapted to align with said sockets when the retainer collar is in position, and a pin adapted to be projected through said bore and engage said sockets to retain the retainer collar in position.

6. A wrist pin comprising a wrist pin body, a flange circumscribing the same intermediate its ends dividing the wrist pin body into a crank bearing portion and a pitman bearing portion, the extremity of the pitman bearing portion being reduced in diameter and formed with a threaded portion, a collar fitting between the threaded portion and the larger portion, a nut threaded on the threaded portion of the reduced end and clamping said collar against the larger portion, a sleeve arranged over the body intermediate the collar and the flange, said sleeve being slightly less in length than the distance between the collar and the flange, said sleeve being slightly larger in diameter than the collar, rollers interposed between the sleeve and the wrist pin body to provide an anti-friction bearing, a retainer collar bored to receive the reduced end and counterbored to accommodate the nut whereby its inner end will abut against the collar, said inner end of the retainer collar being formed with a flange to cooperate with the flange on the wrist pin body to retain a pitman bearing therebetween, said retainer collar having sockets formed at its outer end, said reduced end having a diametrically extending bore adapted to align with said sockets when the retainer collar is in position, a pin adapted to be projected through said bore and engage said sockets to retain the retainer collar in position, the extremity of the crank bearing portion being formed with adjacent threaded portions having threads of different leads, and nuts to threadedly engage the threads to clamp a crank bearing between them and the flange.

7. A wrist pin comprising a wrist pin body, a flange arranged intermediate the ends of the same to divide the body into a crank bearing portion and a pitman bearing portion, the outer extremity of the pitman bearing portion being reduced in diameter, a sleeve arranged over the pitman bearing portion, a plurality of rollers interposed between the sleeve and the pitman bearing portion, means retaining the sleeve and rollers in position, a retainer collar arranged over the reduced end, said retainer collar having a flange cooperating with the flange on the body to retain a pitman bearing therebetween, and means removably securing said retainer collar in position.

REUBEN C. BAKER.